United States Patent
Kaushik et al.

(10) Patent No.: US 12,207,092 B2
(45) Date of Patent: Jan. 21, 2025

(54) SYSTEM AND METHOD FOR ROGUE DEVICE DETECTION

(71) Applicant: SOPHOS LIMITED, Oxfordshire (GB)

(72) Inventors: Anil Kaushik, Karnataka (IN); Shail Talati, Santa Clara, CA (US); Dirk Bolte, Bade-Wuerttemberg (DE)

(73) Assignee: Sophos Limited, Oxfordshire (GB)

( * ) Notice: Subject to any disclaimer, the term of this patent is extended or adjusted under 35 U.S.C. 154(b) by 833 days.

(21) Appl. No.: 17/212,265

(22) Filed: Mar. 25, 2021

(65) Prior Publication Data

US 2021/0329459 A1   Oct. 21, 2021

(30) Foreign Application Priority Data

Apr. 17, 2020   (IN) ............................. 202011016648

(51) Int. Cl.
| | |
|---|---|
| H04L 9/30 | (2006.01) |
| H04L 9/40 | (2022.01) |
| H04L 29/06 | (2006.01) |
| H04W 12/08 | (2021.01) |
| H04W 12/122 | (2021.01) |

(52) U.S. Cl.
CPC ....... *H04W 12/122* (2021.01); *H04L 63/1425* (2013.01); *H04L 63/1491* (2013.01); *H04L 63/20* (2013.01); *H04W 12/08* (2013.01)

(58) Field of Classification Search
CPC ............. H04W 12/122; H04L 63/1425; H04L 63/1491
See application file for complete search history.

(56) References Cited

U.S. PATENT DOCUMENTS

| | | | |
|---|---|---|---|
| 9,088,894 B1* | 7/2015 | Kaushik | H04W 12/12 |
| 2009/0235354 A1* | 9/2009 | Gray | H04L 63/1416 |
| | | | 709/224 |
| 2014/0099913 A1* | 4/2014 | Zellner | H04W 4/02 |
| | | | 455/404.2 |

FOREIGN PATENT DOCUMENTS

| | | |
|---|---|---|
| EP | 1283630 | 2/2006 |
| WO | WO2016034518 | 3/2016 |

OTHER PUBLICATIONS

"First Examination Report in IN Application No. 202011016648", Nov. 30, 2021, 6 Pages.

* cited by examiner

*Primary Examiner* — Wasika Nipa
(74) *Attorney, Agent, or Firm* — IP Spring (57) ABSTRACT

Methods, systems and computer readable media for rogue device detection are described. The method may include automatically generating one or more dummy network identifiers associated with a wireless network, advertising the one or more dummy network identifiers, and identifying a device as a suspect device based on receiving a connection attempt to at least one of the one or more dummy network identifiers by the device. The method can also include allocating a virtual local area network within the wireless network to process traffic associated with the at least one of the one or more dummy network identifiers, and monitoring network traffic of the suspect device on the virtual local area network. The method can further include, if the monitored network traffic meets an abnormality threshold, determining that the suspect device is a rogue device, and performing an action to protect the wireless network from the rogue device.

18 Claims, 5 Drawing Sheets

SYSTEM AND METHOD FOR ROGUE DEVICE DETECTION

RELATED APPLICATIONS

This application claims priority to IN Application No. 202011016648, filed Apr. 17, 2020, the contents of which is incorporated herein by reference in its entirety.

TECHNICAL FIELD

Embodiments relate generally to wireless computer networks, and more particularly, but not exclusively, to methods, systems, and computer readable media for rogue device detection.

BACKGROUND

Devices that can access networks via wired or wireless connections have proliferated. As a consequence, the variety of threats, devices, applications, and communication protocols has also increased. Implementing and maintaining effective network security in dynamic and rapidly changing network environments can be a challenge for users. Embodiments were conceived in light of the above mentioned needs, challenges and/or limitations, among other things.

SUMMARY

In general, some implementations may include a system configured to detect rogue devices attempting to access a network such as a wireless network.

One or more embodiments may include methods, systems and computer readable media for rogue device detection. Some implementations may include a method. The method may include automatically generating one or more dummy network identifiers associated with a wireless network, advertising the one or more dummy network identifiers, and identifying a device as a suspect device based on receiving a connection attempt to at least one of the one or more dummy network identifiers by the device. The method can also include allocating a virtual local area network within the wireless network to process traffic associated with the at least one of the one or more dummy network identifiers, and monitoring network traffic of the suspect device on the virtual local area network. The method can further include, if the monitored network traffic meets an abnormality threshold, determining that the suspect device is a rogue device, and performing an action to protect the wireless network from the rogue device.

In some implementations, generating the one or more dummy network identifiers can include generating a dummy network identifier based on a keyword. In some implementations, performing the action includes one or more of blocking access to the wireless network by the rogue device or quarantining the rogue device to limit access to the wireless network.

In some implementations, performing the action includes transmitting an identifier of the rogue device to one or more other devices coupled to the wireless network. In some implementations, the determining includes transmitting, to a cloud-based network security system remote from a wireless endpoint that performs the advertising, one or more parameters of the monitored network traffic, and receiving, from the cloud-based network security system, an indication that the monitored network traffic meets the abnormality threshold.

In some implementations, the identifying can be performed at a network device within the wireless network that received a list of the one or more dummy network identifiers and that determines that the device is a suspect device based on one or more attempts by the device to connect to the one or more dummy network identifiers. In some implementations, the identifying can be performed at a cloud-based network security system and the device can include a device previously determined to be authentic by the cloud-based network security system. In some implementations, the cloud-based network security system can determine that the device has been compromised based on a connection attempt by the device to access the one or more dummy network identifiers. In some implementations, the connection attempt can include a plurality of attempts, and the device can be determined to be compromised when a count of the plurality of attempts exceeds a threshold.

In some implementations, advertising the one or more dummy network identifiers via the wireless network can include sending a command to a known access point within the wireless network to advertise the one or more dummy network identifiers. The method can also include sending a command to the known access point to stop advertising the one or more dummy network identifiers and to listen for any endpoint devices attempting to access a network identified by the one or more dummy network identifiers. The method can further include identifying a physical location of the rogue device using a wireless location finding technique.

Some implementations can include a threat management system, comprising one or more processors; and a nontransitory computer readable medium coupled to the one or more processors, the nontransitory computer readable medium having stored thereon instructions that, when executed by the one or more processors, causes the one or more processors to perform operations. The operations can include automatically generating one or more dummy network identifiers associated with a wireless network, and advertising the one or more dummy network identifiers. The operations can also include identifying a device as a suspect device based on receiving a connection attempt to at least one of the one or more dummy network identifiers by the device, and monitoring network traffic of the suspect device on the network. The operations can further include, if the monitored network traffic meets an abnormality threshold, determining that the suspect device is a rogue device, and performing an action to protect the wireless network from the rogue device.

In some implementations, generating the one or more dummy network identifiers includes generating each dummy network identifier based on a keyword. In some implementations, the action includes one or more of blocking access to the wireless network by the rogue device or quarantining the rogue device to limit access to the wireless network.

In some implementations, the action includes transmitting an identity of the rogue device to one or more other devices coupled to the wireless network. In some implementations, the device is one of an endpoint device or an access point.

The operations can also include allocating a virtual local area network within the wireless network to process traffic associated with the at least one of the one or more dummy network identifiers. In some implementations, the determining includes transmitting, to a cloud-based network security system remote from a wireless endpoint that performs the advertising, one or more parameters of the monitored network traffic, and receiving, from the cloud-based network security system, an indication that the monitored network traffic meets the abnormality threshold.

Some implementations can include nontransitory computer readable medium having stored thereon instructions that, when executed by one or more processors, causes the one or more processors to perform operations. The operations can include automatically generating one or more dummy network identifiers associated with a wireless network, and advertising the one or more dummy network identifiers via the wireless network. The operations can also include identifying a device as a suspect device based on receiving a connection attempt to one of the one or more dummy network identifiers by the device, and monitoring network traffic of the suspect device on the wireless network. The operations can further include, if the monitored network traffic meets an abnormality threshold, determining that the suspect device is a rogue device, and performing an action to protect the wireless network from the rogue device.

In some implementations, the instructions for determining include instructions for transmitting, to a cloud-based network security system remote from a wireless endpoint that performs the advertising, one or more parameters of the monitored network traffic, and receiving, from the cloud-based network security system, an indication that the monitored network traffic meets the abnormality threshold.

In some implementations, the instructions to perform the action further include instructions to perform one or more of quarantining the rogue device to limit access to the wireless network, or transmitting an identity of the rogue device to one or more other devices coupled to the wireless network.

DETAILED DESCRIPTION

Embodiments were conceived in light of the above mentioned needs, challenges and/or limitations, among other things. In general, some implementations may help provide wireless computer network security through rogue device detection.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

As described herein, a threat management system may use a Sensor, Events, Analytics, and Response (SEAR) approach to protect enterprises against cybersecurity threats.

Figure 1:
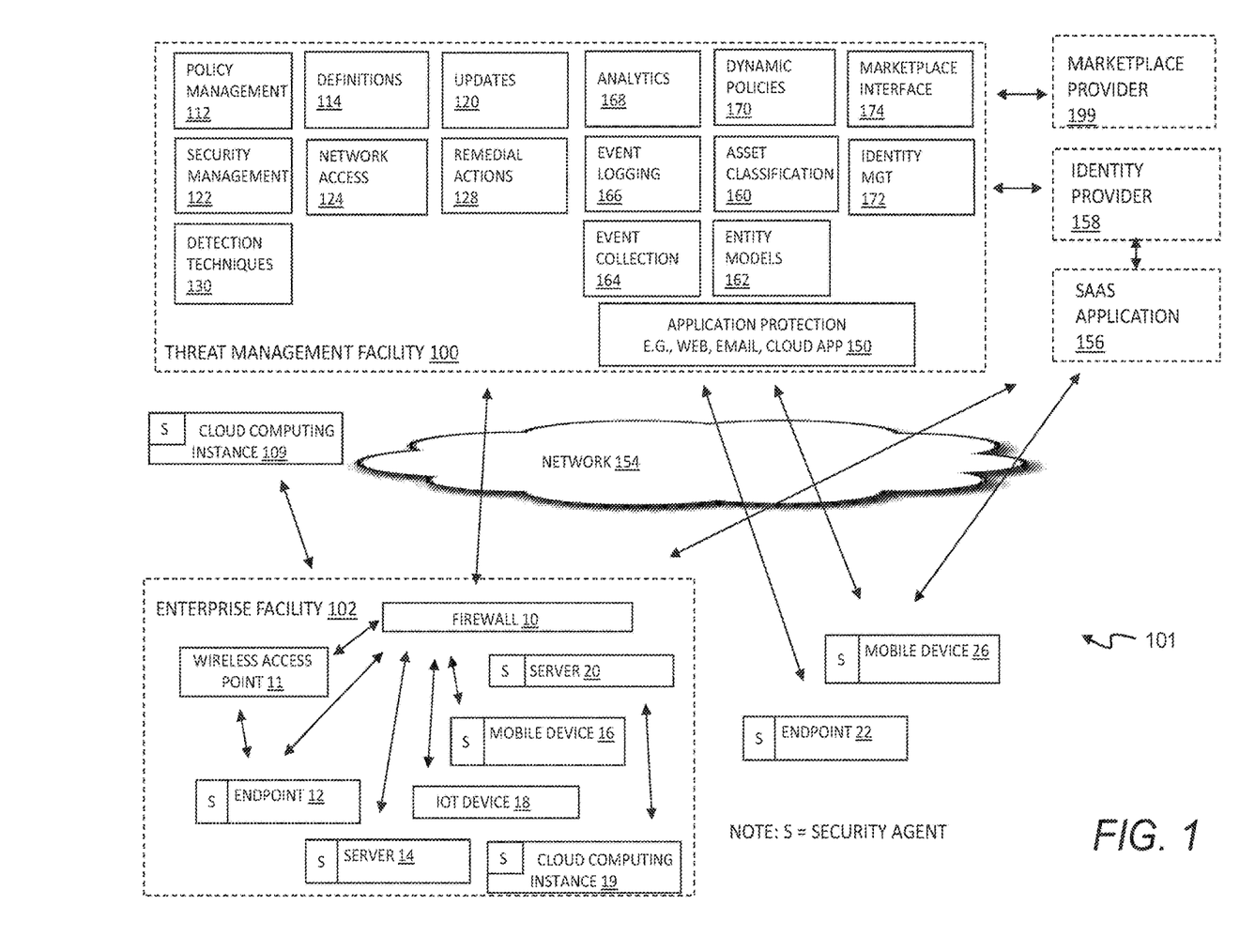
FIG. 1 is a block diagram of a threat management system, in accordance with some implementations.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated, and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is merely exemplary and it will be understood that there may be any number of compute instances, less or more of each type of compute instances, and other types of compute instances. As shown, the exemplary enterprise facility 102 compute instances include a firewall 10, a wireless access point 11, an endpoint 12, a server 14, a mobile device 16, an appliance or Internet of Things (TOT) device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100 and/or 112-174 may be provided as part of a security agent S that is included in software running on a compute instance 10-26 within the enterprise facility. Some or all of one or more of the facilities 100 and/or 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider 199 may communicate with the threat management facility 100 via the marketplace interface facility 174 to provide additional functionality or capabilities to the threat management facility 100 and compute instances 10-26. A marketplace provider 199 may be selected from a number of providers in a marketplace of providers that are available for integration or collaboration via the marketplace interface facility 174. A given marketplace provider 199 may use the marketplace interface facility 174 even if not engaged or enabled from or in a marketplace. As non-limiting examples, the marketplace provider 199 may be a third party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination of these.

In embodiments, aspects of the threat management facility 100 may be provided as a stand-alone solution. In other embodiments, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, Uniform Resource Identifier (URI) filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In an embodiment, the policy management facility 112 and the security facility 122 may work in concert with the update management facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 1026, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility. Observations or inferences about events may also be logged by the event logging facility 166. When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Figure 2:
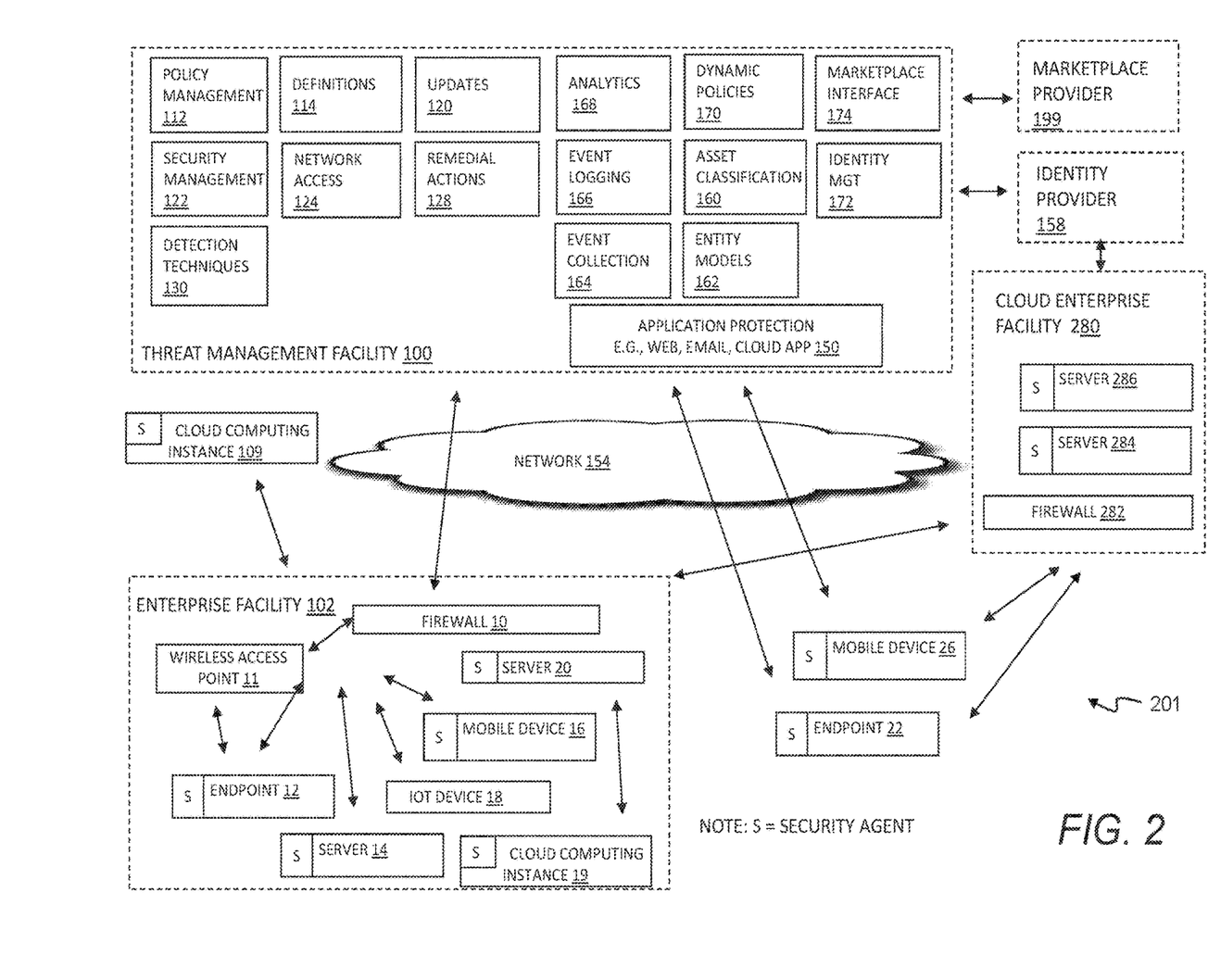
FIG. 2 is a block diagram of a threat management system, in accordance with some implementations.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
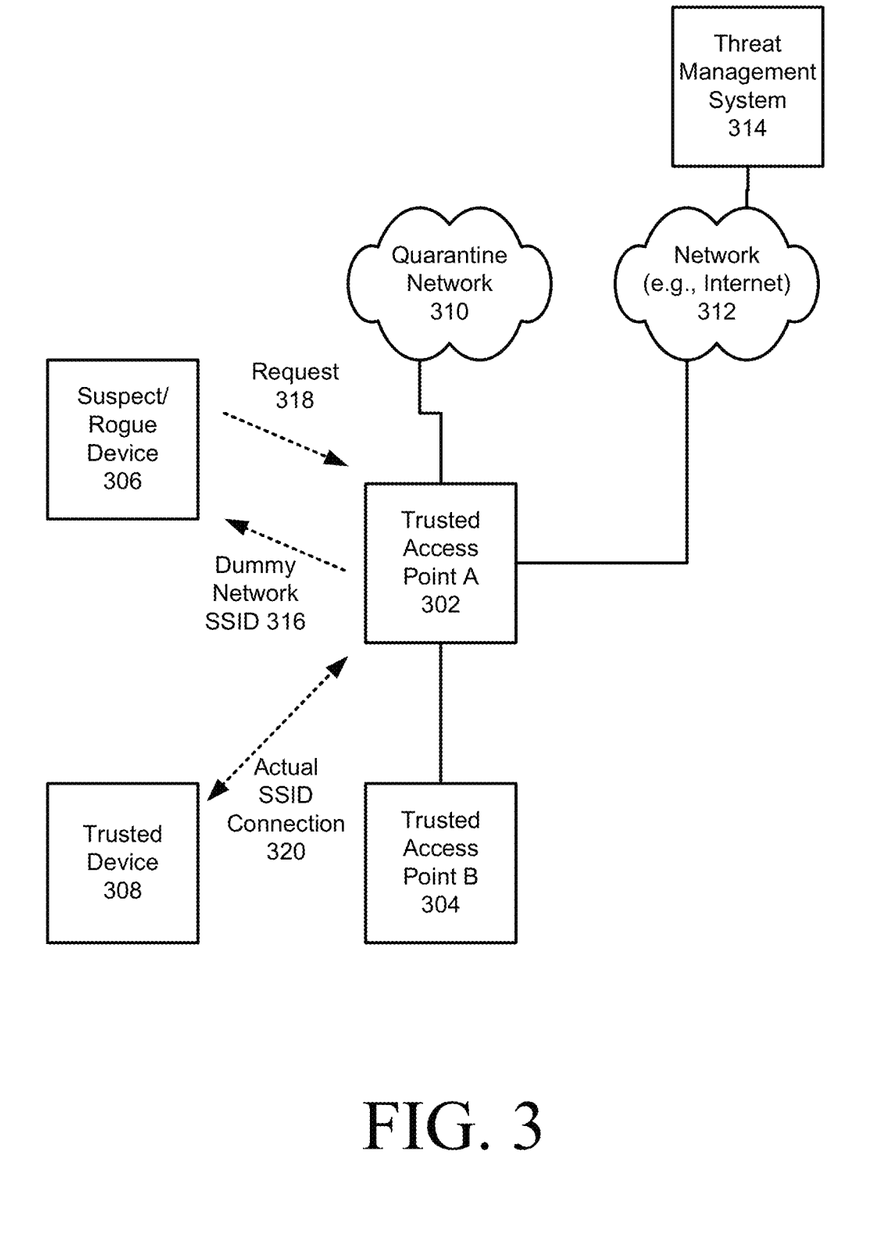
FIG. 3 is a block diagram of a suspect device responding to a dummy network identifier, in accordance with some implementations.

FIG. 3 is a block diagram of an environment 300 including a first trusted access point 302, a second trusted access point 304, a suspect/rogue device 306, a trusted device 308, a quarantine network 310, a network 312, and a threat management system 314.

In operation, the first trusted access point 302 advertises one or more dummy network identifiers 316 (e.g., service set identifier (SSID), basic service set identifier (BSSID), etc.). A suspect device 306 requests connection 318 to one of the dummy network identifiers 316 advertised by the first trusted access point 302. The first trusted access point 302 grants network access to the suspect device 306. In some implementations, traffic for the suspect device 306 may be isolated from other traffic, e.g., by allocating a separate virtual LAN (VLAN) for such traffic.

The first trusted access point 302 and/or the threat management system 314 can monitor network traffic from the suspect device 306 to determine if the network traffic meets an abnormality threshold. If the network traffic from the suspect device 306 meets the abnormality threshold, then the first trusted access point 302 and/or the threat management system 314 determine that the suspect device 306 is a rogue device.

In response to device 306 being detected as a rogue device, the first trusted access point 302 can perform one or more actions to protect the network 312 from the rogue device 306. The steps can include quarantining the rogue device 306 to a quarantine network 310 that is distinct from a network 312 that carries traffic for trusted devices (e.g., trusted device 308) for further observation and/or surveillance. By quarantining the rogue device 306 to a quarantine network, the rogue device 306 can be observed without placing the actual network 312 or its resources in jeopardy.

In addition, or as an alternative, the first trusted access point 302 can block the connection of the rogue device 306. The blocking can be full (e.g., no access to any network resources) or partial (e.g., access to some network resources, but not all network resources). The first trusted access point 302 can also communicate the identity of the rogue device to the second trusted access point 304, the threat management system 314, or other network devices (e.g., firewalls, other endpoints, etc.). For example, the identity of the rogue device 306 may include a medium access control (MAC) address of the rogue device 306.

Trusted endpoint devices, such as trusted device 308, may access network 312 and associated resources using an actual network identifier 320. Use of an actual network identifier 320 as opposed to a dummy network identifier 316 can be, in part, an indication to the trusted access points (302, 304) and the threat management system 314 that the trusted device 308 is not a suspect or rogue device. Also, a trusted device can include a network device (e.g., endpoint or access point) that has been registered and/or authenticated by the threat management system 314. Prior to the trusted access point 302 advertising the dummy network identifiers 316, the trusted access point 302 may communicate to trusted devices (e.g., 304 and 308), for example, via a synchronized security system message, a list of one or more dummy network identifiers that will be advertised so that trusted devices do not attempt to connect to the dummy network identifiers. The synchronized security message can include a status or "heartbeat" message from a threat management system to a network device registered with the threat management system or vice versa.

When a previously trusted device (e.g., 308) attempts to access one of the dummy network identifiers, the trusted access point 302 or threat management system 314 can determine that this is an indication that the previously trusted device may have been compromised and may need to be treated as a suspect or rogue device according to the method described herein.

Figure 4:
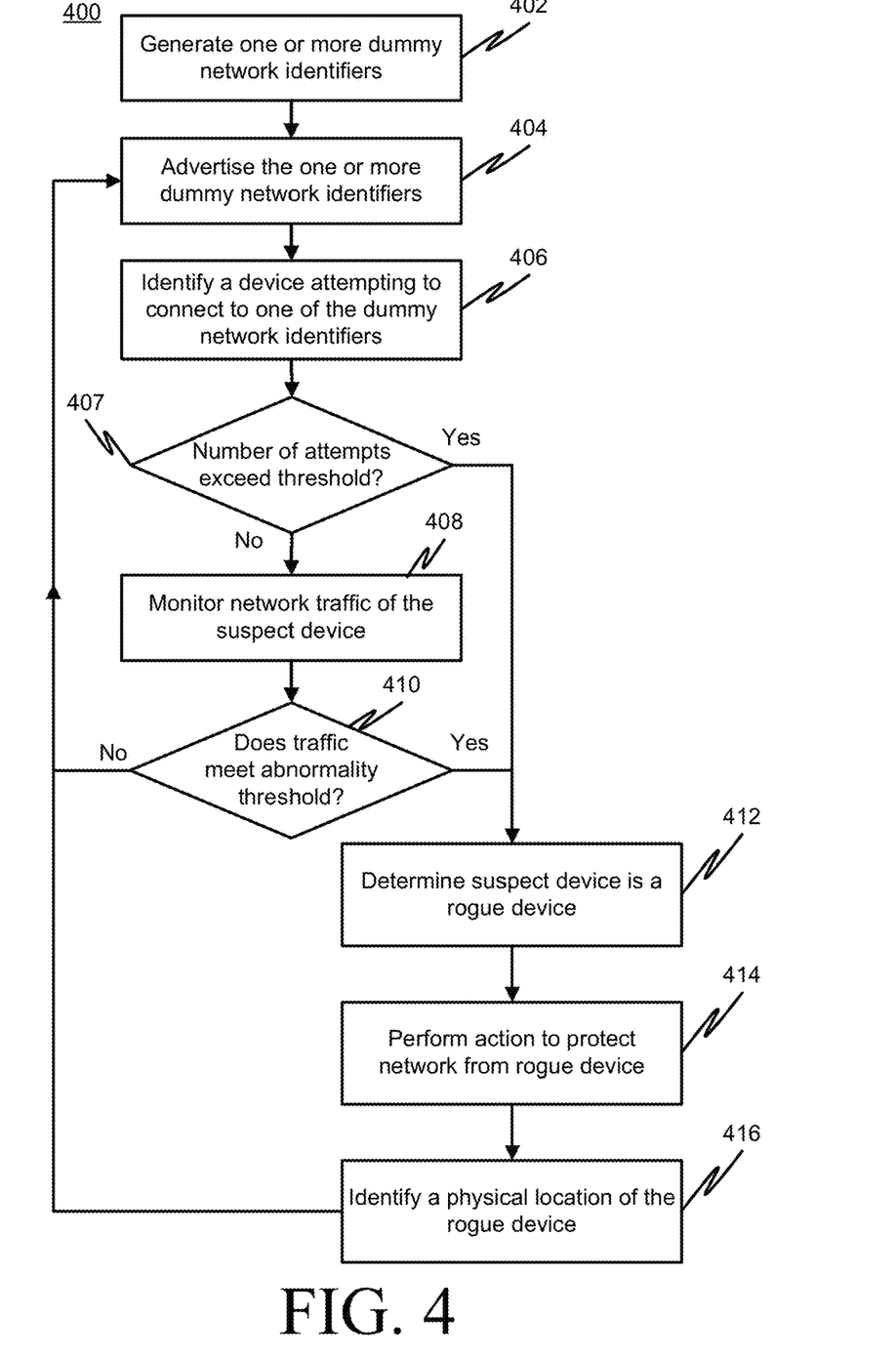
FIG. 4 is a flowchart showing an example method for rogue device detection, in accordance with some implementations.

FIG. 4 is a flowchart showing an example method 400 (e.g., a computer-implemented method) for rogue device detection, in accordance with some implementations.

In some implementations, method 400 can be implemented, for example, on a network device such as an access point (e.g., 402 or 404), on a threat management system (e.g., 100), an enterprise facility (e.g., 102), a cloud enterprise facility 280, or other device or a combination of devices. In other implementations, some or all of the method 400 can be implemented on one or more devices of 100 or 102 as shown in FIG. 1 or 280 as shown in FIG. 2, one or more server devices, and/or on both server device(s) and client device(s). In described examples, the implementing system includes one or more digital hardware processors or processing circuitry ("processors"), and one or more storage devices. In some implementations, different components of one or more devices or facilities can perform different blocks or other parts of the method 400.

In some implementations, the method 400, or portions of the method, can be initiated automatically by a device. For example, the method (or portions thereof) can be periodically performed or performed based on the occurrence of one or more particular events or conditions. For example, such events or conditions can include a device (e.g., an unknown device) attempting to connect to a dummy network identifier, a predetermined time period having expired since the last performance of method 400, and/or one or more other events or conditions occurring which can be specified in settings of a device implementing method 400. In some implementations, such conditions can be previously specified by a user in stored custom preferences of the user (accessible by a device or method with user consent). In some examples, a device (server or client) can perform the method 400 with access to one or more applications that receive short answer responses. In another example, a network device can perform the method 400. In addition, or alternatively, a network device can send data to a server (e.g., a threat management facility) over a network, and the server can perform method 400 in whole or in part.

Processing begins at 402, where one or more dummy network identifiers associated with a wireless network are generated. The identifiers can be automatically generated, manually generated or generated automatically based on input received from a user. Generating the one or more dummy network identifiers can include generating each dummy network identifier based on a keyword (e.g., a name associated with the enterprise or organization that operates or owns the wireless network). The dummy network identifiers can combine the keyword and one or more other words that are commonly seen in network identifiers. For example, if the keyword is "Organization", then the dummy network identifiers can include "Organization Free", "Organization Visitor", "Organization Open", etc. Alternatively, the dummy network identifiers can include automatically generated names that do not relate to a keyword. Processing continues to 404.

At 404, the one or more dummy network identifiers are advertised via the wireless network. Advertising can include transmitting the one or more dummy network identifiers over a wireless network. In some implementations, the advertising can include sending a command to a known access point within the wireless network to advertise the one or more dummy network identifiers. The advertised dummy network identifiers are detectable by clients, e.g., detectable as Wi-Fi access points. Processing continues to 406.

At 406, a device attempting to connect to one or more of the dummy network identifiers is identified. Processing continues to 407.

At 407, it is determined if a number of attempts to connection to one or more dummy network identifiers exceeds a threshold number. If the threshold number is not exceeded, processing continues to 408. If the threshold number is exceeded, the device is identified as a suspect device. In some implementations, the identifying can be performed at a network device within the wireless network that received a list of the one or more dummy network identifiers and that determines, at the network device, that the device is a suspect device based on one or more attempts by the device to connect to the one or more dummy network identifiers.

In some implementations, the identifying can be performed at a cloud-based network security system and the device is a device previously determined to be authentic by the cloud-based network security system, and wherein the cloud-based network security system determined that the device has been compromised based on attempts by the device to access the one or more dummy network identifiers. In some implementations, the identifying can include sending a command to the known access point to stop advertising the one or more dummy network identifiers and to listen for any endpoint devices attempting to access a network identified by the one or more dummy network identifiers. If the number of attempts exceeds the threshold, processing continues to 412.

At 408, network traffic of the suspect device on the wireless network is monitored. The monitoring can include monitoring one or more parameters or features of the network traffic from the suspect device. The parameters or features being monitored can include volumes of data, URLs visited, IP session partners, file shares accessed, processes started, usage times, or locations, etc. Processing continues to 410. The network traffic of the suspect device may be monitored or recorded, to determine the specific activities undertaken by the suspect device. For example, if the suspect device attempts to connect to specific devices, uses specific protocols, tests for specific vulnerabilities, attempts to exploit specific vulnerabilities, and so on, similar traffic may be used to later recognize the suspect device or an operator or software on the suspect device.

At 410, determining if the monitored network traffic of the device meets an abnormality threshold processing continues to 412. If the monitored network traffic of the device does not meet the abnormality threshold, then processing continues to 404. Determining whether the monitored network traffic of the device meets the abnormality threshold can include transmitting, to a cloud-based network security system remote from a wireless endpoint that performs the advertising, one or more parameters of the monitored network traffic, and receiving, from the cloud-based network security system, an indication that the monitored network traffic meets the abnormality threshold.

Determining whether the monitored network traffic of the device meets the abnormality threshold may include determining whether the device is a recognized device. Determining whether the monitored network traffic of the device meets the abnormality threshold may include determining whether the device is a managed device. A managed device may have a security agent running on the device that is in communication with a security gateway or a cloud-based network security system. A managed device may be known to a security gateway or a cloud-based network security system as a permitted device. Determining whether the monitored network traffic of the device meets the abnormality threshold may include determining the security status of the device, for example, based on communications from the device, e.g., over a security heartbeat communications channel to a security gateway or a cloud-based network security system. Determining whether the monitored network traffic of the device meets the abnormality threshold may include determining whether network communication is consistent with previous communication of the device.

At 412, when the monitored network traffic of the device meets an abnormality threshold or the number of attempts to connect to one or more dummy network identifiers exceeds a threshold, the suspect device is detected to be a rogue device. Processing continues to 414.

At 414, one or more actions are performed to protect the wireless network from the rogue device. In some implementations, the actions can include one or more of blocking access to the wireless network by the rogue device or quarantining the rogue device to limit access to the wireless network. In some implementations, the actions can include transmitting an identity of the rogue device to one or more other devices coupled to the wireless network. Processing continues to 416.

At 416, a physical location of the rogue device may be identified or estimated using wireless location finding techniques, e.g., signal triangulation, received signal strength indicator (RSSI), etc. The location can be provided to other security systems or to a user interface to inform personnel about a location of the rogue device. It will be appreciated that one or more of blocks 402-416 may be repeated, performed in a different order or performed periodically.

Determining the identity of the device may include determining whether the device is a recognized device, for example, based on a network (e.g., MAC) address. Determining the identity of the device may include determining whether the device is a managed device. A managed device may have a security agent running on the device that is in communication with a security gateway or a cloud-based network security system. A managed device may be known to a security gateway or a cloud-based network security system. Determining the identity of the device may also include determining the security status of the device, for example, based on communications from the device, e.g., over a security heartbeat communications channel to a security gateway or a cloud-based network security system. A managed device that attempts to access a dummy access point may be considered a potentially compromised device or a compromised device.

It should be noted that there may be a lot of information collected about compute instances and users, and this may have privacy implications and scalability implications. Privacy may be addressed in some cases by user notifications and permissions, anonymization, tokenization, and encryption. It may also be useful to optimize the network data being collected or analyzed by one or more of coalescing the data, compressing the data, or serializing the data. Security features may be used to avoid abuse of APIs (e.g., authentication, replay protection, DoS protection). Performance optimizations, such as rate limiting, prioritization, and queue management may be used to improve scalability.

While there is any attempt to access such dummy entities, the system can send back downloaded files to the suspected attacker with script or code embedded into the download files. Such script or code can continue to contact to the remote server and can provide information about the attacker's system to the threat management system. Such information can be used to track suspected attackers. Likewise, characteristics of the device or the network communications of a device that attempts to access dummy entities may be used to recognize and control the device when it attempts to connect or connects to other networks. For example, responses by the device to connection requests to the device on one or more ports may be used to recognize the device. For example, an operating system or software application on the device may periodically attempt to communicate to one or more network devices, and the pattern or combination of the network attempts may be used to recognize the device.

Figure 5:
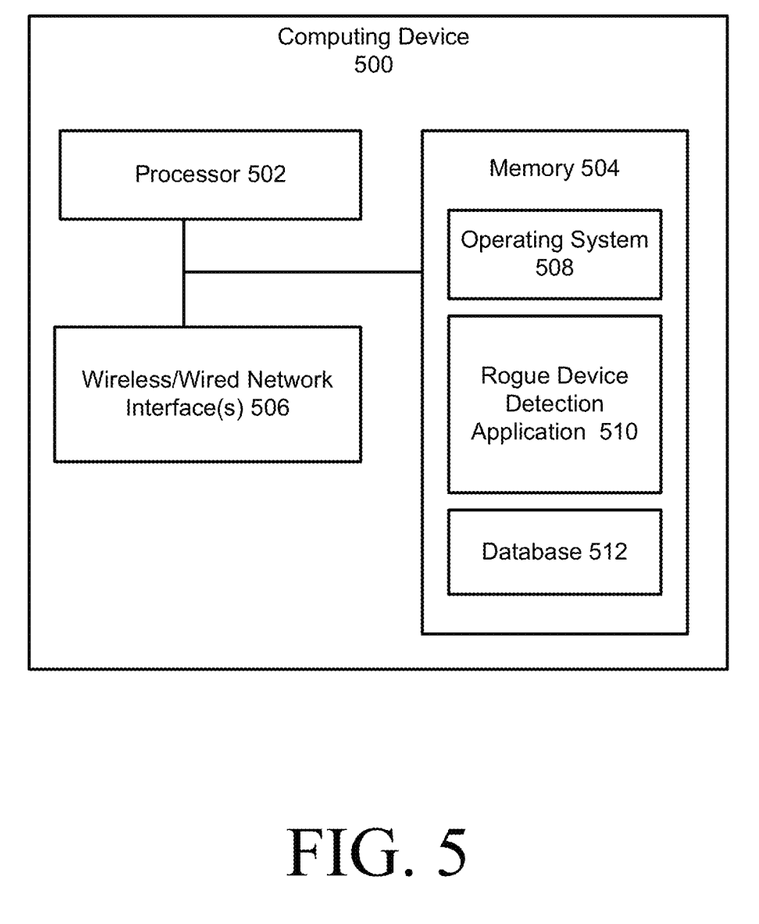
FIG. 5 is a diagram of an example computing device configured for rogue access point detection in accordance with at least one implementation.

FIG. 5 is a diagram of an example computing device 500 in accordance with at least one implementation. The computing device 500 includes one or more processors 502, nontransitory computer readable medium or memory 504, I/O interface devices 506 (e.g., wireless communications, etc.), and a network interface 508, all of which may be operatively coupled to each other by a bus. The computer readable medium 504 may have stored thereon an operating system 508, a rogue device detection application 510 for rogue device detection, and a database 512 (e.g., for storing network identifiers, dummy network identifiers, network device information, etc.).

In operation, the processor 502 may execute the application 510 stored in the computer readable medium 504. The application 510 may include software instructions that, when executed by the processor, cause the processor to perform operations for location-based endpoint security in accordance with the present disclosure (e.g., performing one or more of the operations described with reference to FIG. 4).

The application program 510 may operate in conjunction with the database 512 and the operating system 508. The device 500 may communicate with other devices (e.g., a wireless access point or a threat management system) via the I/O interfaces 506.

It will be appreciated that the modules, processes, systems, and sections described above may be implemented in hardware, hardware programmed by software, software instructions stored on a nontransitory computer readable medium or a combination of the above. A system as described above, for example, may include a processor configured to execute a sequence of programmed instructions stored on a nontransitory computer readable medium. For example, the processor may include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions may be compiled from source code instructions provided in accordance with a programming language such as Java, C, C++, C#.net, assembly or the like. The instructions may also comprise code and data objects provided in accordance with, for example, the Visual Basic™ language, or another structured or object-oriented programming language. The sequence of programmed instructions, or programmable logic device configuration software, and data associated therewith may be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections may be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above may be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein may be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that may be used on a variety of computer platforms. Alternatively, embodiments of the disclosed method, system, and computer program product may be implemented partially or fully in hardware using, for example, standard logic circuits or a VLSI design. Other hardware or software may be used to implement embodiments depending on the speed and/or efficiency requirements of the systems, the particular function, and/or particular software or hardware system, microprocessor, or microcomputer being utilized. Embodiments of the method, system, and computer program product may be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) may be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for detecting rogue devices.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter. It should also be understood that references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

What is claimed is:

1. A computer-implemented method, comprising:
automatically generating one or more dummy network identifiers usable by an endpoint device to connect to an access point associated with a wireless network, wherein the one or more dummy network identifiers include one or more of a service set identifier (SSID) and a basic service set identifier (BSSID);
communicating, via a system security message, to trusted devices on the wireless network, the one or more dummy network identifiers that are to be advertised, wherein the system security message includes a heartbeat message;
advertising, by the access point over the wireless network, the one or more dummy network identifiers;
receiving, at the access point, a connection attempt to at least one of the one or more dummy network identifiers from a device;
identifying the device as a suspect device based on receiving the connection attempt, wherein:
the identifying is performed at a cloud-based network security system,
the device was previously determined to be authentic by the cloud-based network security system,
the cloud-based network security system determines that the device is compromised based on the connection attempt by the device to access the one or more dummy network identifiers, the connection attempt includes a plurality of attempts, and
the device is determined as compromised based on a count of the plurality of attempts exceeding a threshold;
subsequent to identifying the device as the suspect device, allocating a virtual local area network within the wireless network to process traffic associated with the at least one of the one or more dummy network identifiers;
monitoring network traffic of the suspect device on the virtual local area network;
if the monitored network traffic meets an abnormality threshold, determining that the suspect device is a rogue device; and
performing an action to protect the wireless network from the rogue device.

2. The computer-implemented method of claim 1, wherein performing the action includes one or more of blocking access to the wireless network by the rogue device or quarantining the rogue device to limit access to the wireless network.

3. The computer-implemented method of claim 1, wherein performing the action includes transmitting an identifier of the rogue device to one or more other devices coupled to the wireless network.

4. The computer-implemented method of claim 1, wherein the determining comprises:
transmitting, to a cloud-based network security system remote from a wireless endpoint that performs the advertising, one or more parameters of the monitored network traffic; and
receiving, from the cloud-based network security system, an indication that the monitored network traffic meets the abnormality threshold.

5. The computer-implemented method of claim 1, wherein the identifying is performed at a network device within the wireless network that received a list of the one or more dummy network identifiers and that determines that the device is the suspect device based on one or more attempts by the device to connect to the one or more dummy network identifiers.

6. The computer-implemented method of claim 1, wherein advertising the one or more dummy network identifiers via the wireless network includes sending a command to a known access point within the wireless network to advertise the one or more dummy network identifiers.

7. The computer-implemented method of claim 6, further comprising sending a command to the known access point to stop advertising the one or more dummy network identifiers and to listen for any endpoint devices attempting to access a network identified by the one or more dummy network identifiers.

8. The computer-implemented method of claim 1, further comprising identifying a physical location of the rogue device using a wireless location finding technique.

9. A threat management system, comprising:
one or more processors; and
a nontransitory computer readable medium coupled to the one or more processors, the nontransitory computer readable medium having stored thereon instructions that, when executed by the one or more processors, causes the one or more processors to perform operations including:
automatically generating one or more dummy network identifiers usable by an endpoint device to connect to an access point associated with a wireless network;
communicating, via a system security message, to trusted devices on the wireless network, the one or more dummy network identifiers that are to be advertised, wherein the system security message includes a heartbeat message;
advertising, by the access point over the wireless network, the one or more dummy network identifiers;
receiving, at the access point, a connection attempt to at least one of the one or more dummy network identifiers from a device;
identifying the device as a suspect device based on receiving the connection attempt, wherein:
the identifying is performed at a cloud-based network security system,
the device was previously determined to be authentic by the cloud-based network security system,
the cloud-based network security system determines that the device is compromised based on the connection attempt by the device to access the one or more dummy network identifiers,
the connection attempt includes a plurality of attempts, and
the device is determined as compromised based on a count of the plurality of attempts exceeding a threshold;
monitoring network traffic of the suspect device on the wireless network;
if the monitored network traffic meets an abnormality threshold, determining that the suspect device is a rogue device; and
performing an action to protect the wireless network from the rogue device.

10. The threat management system of claim 9, wherein generating the one or more dummy network identifiers includes generating each dummy network identifier based on a keyword associated with an organization that operates the wireless network.

11. The threat management system of claim 9, wherein the action includes one or more of blocking access to the wireless network by the rogue device or quarantining the rogue device to limit access to the wireless network.

12. The threat management system of claim 9, wherein the action includes transmitting an identity of the rogue device to one or more other devices coupled to the wireless network.

13. The threat management system of claim 9, wherein the rogue device is a managed device, and wherein the rogue device is determined to be a compromised device.

14. The threat management system of claim 9, wherein the operations further include allocating a virtual local area network within the wireless network to process traffic associated with the at least one of the one or more dummy network identifiers.

15. The threat management system of claim 9, wherein the determining comprises:
transmitting, to a cloud-based network security system remote from a wireless endpoint that performs the advertising, one or more parameters of the monitored network traffic; and
receiving, from the cloud-based network security system, an indication that the monitored network traffic meets the abnormality threshold.

16. A nontransitory computer readable medium having stored thereon instructions that, when executed by one or more processors, causes the one or more processors to perform operations including:

automatically generating one or more dummy network identifiers usable by an endpoint device to connect to an access point associated with a wireless network, wherein the one or more dummy network identifiers include one or more of a service set identifier (SSID) and a basic service set identifier (BSSID);

communicating, via a system security message, to trusted devices on the wireless network, the one or more dummy network identifiers that are to be advertised, wherein the system security message includes a heartbeat message;

advertising, by the access point over the wireless network, the one or more dummy network identifiers via the wireless network;

receiving, at the access point, a connection attempt to at least one of the one or more dummy network identifiers from a device;

identifying the device as a suspect device based on receiving the connection attempt, wherein:
- the identifying is performed at a cloud-based network security system,
- the device was previously determined to be authentic by the cloud-based network security system,
- the cloud-based network security system determines that the device is compromised based on the connection attempt by the device to access the one or more dummy network identifiers,
- the connection attempt includes a plurality of attempts, and
- the device is determined as compromised based on a count of the plurality of attempts exceeding a threshold;

monitoring network traffic of the suspect device on the wireless network;

if the monitored network traffic meets an abnormality threshold, determining that the suspect device is a rogue device; and performing an action to protect the wireless network from the rogue device.

17. The nontransitory computer readable medium of claim 16, wherein the instructions for determining further comprise instructions for:
   transmitting, to a cloud-based network security system remote from a wireless endpoint that performs the advertising, one or more parameters of the monitored network traffic; and
   receiving, from the cloud-based network security system, an indication that the monitored network traffic meets the abnormality threshold.

18. The nontransitory computer readable medium of claim 16, wherein the instructions to perform the action further include instructions to perform one or more of the following:
   blocking access to the wireless network by the rogue device;
   quarantining the rogue device to limit access to the wireless network; or
   transmitting an identity of the rogue device to one or more other devices coupled to the wireless network.

* * * * *